US009495819B2

United States Patent
Morita

(10) Patent No.: US 9,495,819 B2
(45) Date of Patent: Nov. 15, 2016

(54) LOCK DEVICE AND ELECTRONIC KEY SYSTEM FOR USE WITH VEHICLE CHARGING INLET

(71) Applicant: KABUSHIKI KAISHA TOKAI RIKA DENKI SEISAKUSHO, Aichi (JP)

(72) Inventor: Keiji Morita, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 7 days.

(21) Appl. No.: 14/086,097

(22) Filed: Nov. 21, 2013

(65) Prior Publication Data

US 2014/0167913 A1 Jun. 19, 2014

(30) Foreign Application Priority Data

Dec. 13, 2012 (JP) ................................. 2012-272490

(51) Int. Cl.
*G07C 9/00* (2006.01)
*B60L 11/18* (2006.01)

(52) U.S. Cl.
CPC ........ *G07C 9/00174* (2013.01); *B60L 11/1818* (2013.01); *B60L 11/1838* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
USPC ....................................................... 340/5.61
See application file for complete search history.

(56) References Cited

U.S. PATENT DOCUMENTS

| 5,202,617 A | * | 4/1993 | Nor | B60L 3/12 320/109 |
| 5,478,250 A | | 12/1995 | Hoffman | |
| 8,022,808 B2 | | 9/2011 | Kurpinski et al. | |
| 8,265,816 B1 | * | 9/2012 | LaFrance | B60R 25/045 320/109 |
| 8,321,081 B2 | * | 11/2012 | Nakamura | B60L 3/00 701/22 |

(Continued)

FOREIGN PATENT DOCUMENTS

| CN | 201015044 | 1/2008 |
| CN | 101821467 | 9/2010 |

(Continued)

OTHER PUBLICATIONS

Office Action issued in U.S. Appl. No. 14/096,673, dated Oct. 1, 2015.

(Continued)

*Primary Examiner* — Brian Miller
(74) *Attorney, Agent, or Firm* — Greenblum & Bernstein, P.L.C.

(57) ABSTRACT

A lock device is arranged in a vehicle including an inlet used for charging. The vehicle is configured to perform a predetermined control operation in accordance with a control request signal transmitted through wireless communication from an electronic key when a normal operation is performed on a control switch of the electronic key. The lock device includes a lock mechanism configured to switch a locking subject related with the inlet between a lock state and an unlock state. A controller controls the lock mechanism to switch the locking subject between a lock state and an unlock state when detecting a special operation performed on the control switch.

13 Claims, 4 Drawing Sheets

(56) References Cited

U.S. PATENT DOCUMENTS

| | | | | |
|---|---|---|---|---|
| 8,357,001 | B2* | 1/2013 | Katagiri | B60L 11/1818 439/304 |
| 8,376,767 | B2* | 2/2013 | Kahara | B60K 15/03 439/304 |
| 8,376,768 | B2* | 2/2013 | Kurumizawa | B60L 11/14 439/304 |
| 8,514,085 | B2* | 8/2013 | Nelson | F16P 3/142 340/573.1 |
| 8,523,596 | B2* | 9/2013 | Inoue | G07C 9/00182 439/310 |
| 8,550,833 | B2* | 10/2013 | Martin | H01R 13/6395 439/310 |
| 8,602,804 | B2* | 12/2013 | Kurumizawa | B60L 11/14 320/109 |
| 8,690,591 | B2* | 4/2014 | Charnesky | B60L 11/1818 191/12.4 |
| 8,708,728 | B2* | 4/2014 | Hirashita | B60L 11/1818 439/304 |
| 8,712,648 | B2* | 4/2014 | Charnesky | H01R 13/6272 439/304 |
| 8,753,136 | B2* | 6/2014 | Hirashita | B60L 11/1818 439/304 |
| 8,816,815 | B2* | 8/2014 | Kuramochi | H01R 13/6367 340/5.64 |
| 8,936,482 | B2* | 1/2015 | Smith | E05B 47/026 33/1 PT |
| 8,951,060 | B2* | 2/2015 | Meyer-Ebeling | H01R 13/639 320/109 |
| 2009/0082916 | A1 | 3/2009 | Tanaka | |
| 2010/0007461 | A1* | 1/2010 | Lacour | G07C 9/00309 340/5.61 |
| 2010/0194529 | A1* | 8/2010 | Yamamoto | B60L 11/1824 340/5.65 |
| 2010/0211272 | A1 | 8/2010 | Ichihara | |
| 2011/0281447 | A1* | 11/2011 | Kano | B60L 11/1818 439/133 |
| 2011/0287649 | A1* | 11/2011 | Kurumizawa | B60L 11/1818 439/304 |
| 2011/0300733 | A1* | 12/2011 | Janarthanam | B60L 11/1818 439/304 |
| 2011/0306223 | A1 | 12/2011 | Bauer | |
| 2012/0071017 | A1* | 3/2012 | Gaul | B60L 11/1825 439/304 |
| 2012/0126747 | A1* | 5/2012 | Kiko | B60L 3/0069 320/109 |
| 2012/0133326 | A1* | 5/2012 | Ichikawa | B60L 11/14 320/109 |
| 2012/0135634 | A1* | 5/2012 | Gaul | B60L 11/1818 439/488 |
| 2013/0040486 | A1* | 2/2013 | Kurumizawa | H01R 13/639 439/350 |
| 2013/0222111 | A1* | 8/2013 | Inoue | G05B 1/01 340/5.65 |
| 2014/0022053 | A1* | 1/2014 | Inoue | G07C 9/00174 340/5.61 |
| 2014/0165675 | A1* | 6/2014 | Morita | B60L 11/1818 70/256 |
| 2014/0167913 | A1* | 6/2014 | Morita | B60L 11/1818 340/5.61 |
| 2014/0179141 | A1* | 6/2014 | Kojima | B60L 11/1818 439/296 |
| 2014/0200757 | A1* | 7/2014 | Kojima | B60L 11/14 701/22 |

FOREIGN PATENT DOCUMENTS

| | | |
|---|---|---|
| JP | 2005-280586 | 10/2005 |
| JP | 2009-081917 | 4/2009 |
| JP | 2011-244590 | 12/2011 |
| JP | 2012-044846 | 3/2012 |
| JP | 2012-226911 | 11/2012 |

OTHER PUBLICATIONS

Japanese Office Action for JP 2012-272490, mail date is Feb. 16, 2016, along with English translation.

Japanese Office Action for JP 2012-272491, mail date is Mar. 22, 2016, along with English translation.

Office Action from State Intellectual Property Office (SIPO) of the People's Republic of China in Chinese Patent Application No. 201310654918.3, dated Jul. 12, 2016, limited consideration as not in English language.

Office Action from State Intellectual Property Office (SIPO) of the People's Republic of China in Chinese Patent Application No. 201310664489.8, dated Sep. 8, 2016.

* cited by examiner

Fig.2A
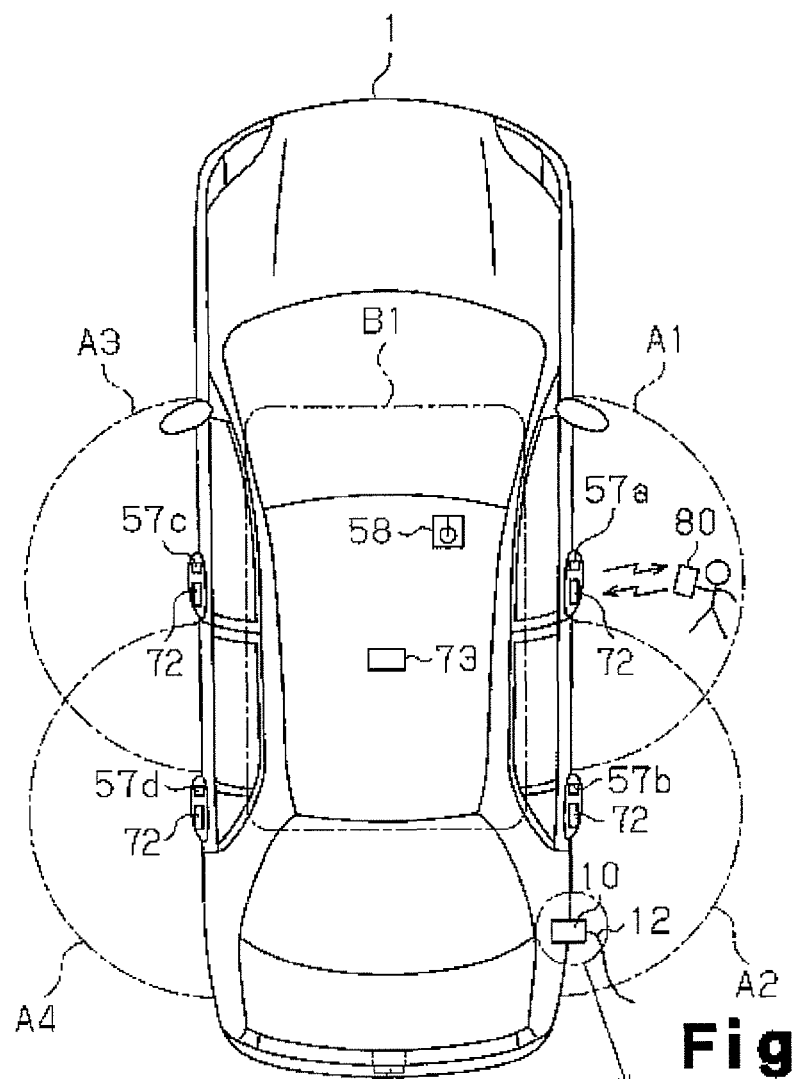
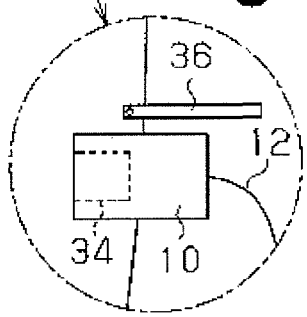
Fig.2B

LOCK DEVICE AND ELECTRONIC KEY SYSTEM FOR USE WITH VEHICLE CHARGING INLET

CROSS-REFERENCE TO RELATED APPLICATIONS

This application is based upon and claims the benefit of priority from prior Japanese Patent Application No. 2012-272490, filed on Dec. 13, 2013, the entire contents of which are incorporated herein by reference.

BACKGROUND

The present invention relates to a lock device that locks a power plug connected to an inlet.

Battery-powered electric vehicles, such as electric vehicles and hybrid electric vehicles, are environment-friendly and have become popular. A battery-powered electric vehicle includes an inlet connectable to a power plug extending from, for example, a household commercial power supply to charge the battery of the vehicle.

When charging the battery, to prevent unauthorized removal of the power plug from the vehicle and prevent theft of the power plug, a plug lock device may be used to lock the power plug to the inlet and restrict unauthorized removal of the power plug.

For example, the plug lock device may include an LF antenna. The plug lock device transmits a request signal from the LF antenna to the surrounding of the inlet. When a request signal is received from an electronic key, wireless communication is performed between the electronic key and the vehicle. After the electronic key is verified through wireless communication, when an unlock switch arranged near the inlet is operated, the power plug is unlocked (refer to, for example, Japanese Laid-Open Patent Publication No. 2011-244590). Thus, only the user, who is carrying the authentic electronic key, may unlock the power plug and remove the power plug from the inlet.

The plug lock device described in the '590 publication has a complicated structure due to the unlock switch physically arranged near the inlet.

SUMMARY

It is an object of the present invention to provide a lock device having a simple structure.

One aspect of the present invention is a lock device arranged in a vehicle including an inlet used for charging. The vehicle is configured to perform a predetermined control operation in accordance with a control request signal transmitted through wireless communication from an electronic key when a normal operation is performed on a control switch of the electronic key. The lock device includes a lock mechanism configured to switch a locking subject related with the inlet between a lock state and an unlock state. A controller controls the lock mechanism to switch the locking subject between a lock state and an unlock state when detecting a special operation performed on the control switch.

An aspect of the present invention is an electronic key system including an electronic key and a controller. The electronic key transmits through wireless communication a door unlock request signal and a first special request signal. The controller is programmed to control a door lock device and a power plug lock mechanism that are arranged in a vehicle. The electronic key includes a first switch button and a key control unit, which holds a threshold and is connected to the first switch button. The key control unit is programmed to generate either one of the door unlock request signal and the first special request signal when the first switch button is pushed in accordance with a comparison of the threshold with a pushed period or pushed number of times of the first switch button. The controller includes instructions configured to control the door lock device to unlock doors in accordance with the door unlock request received from the electronic key. The controller includes instructions configured to control the power plug lock mechanism to unlock the power plug in accordance with the first special request signal received from the electronic key.

Further aspect of the present invention is an electronic key system including an electronic key and a controller. The electronic key includes a first switch button and a key control unit, which transmits through wireless communication a door unlock request signal when the first switch button is pushed. The controller is programmed to control a door lock device and a power plug lock mechanism that are arranged in a vehicle. The controller includes instructions configured to control the door lock device to unlock doors in accordance with the door unlock request that is received when the doors are locked by the door lock device. The controller includes instructions configured to control the power plug lock mechanism to unlock the power plug in accordance with the door unlock request signal that is received when the doors are unlocked by the door lock device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2A is a schematic diagram showing a transmission area of a request signal in the first embodiment;

FIG. 2B is a partially enlarged view of FIG. 2A;

DESCRIPTION OF EMBODIMENTS

A lock device according to a first embodiment of the present invention will now be described with reference to FIGS. 1 to 3.

Figure 1:
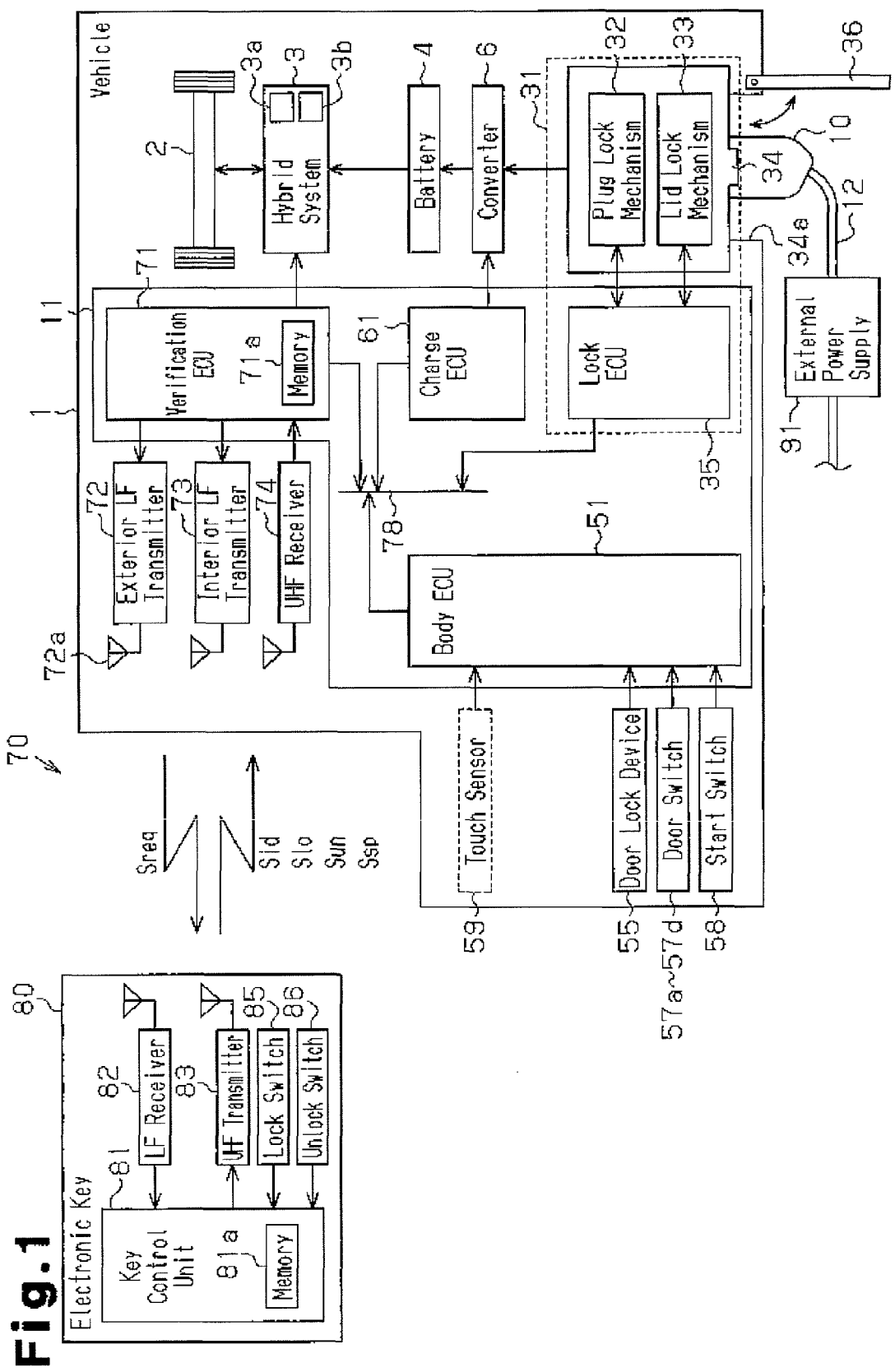
FIG. 1 is a block diagram of a vehicle and an electronic key in a first embodiment.

Referring to FIG. 1, a hybrid electric vehicle 1 performs wireless communication with an electronic key 80 to permit or perform the locking and unlocking of vehicle doors, the switching to a drivable state, and the activation of the power plug lock device.

In the illustrated example, an electronic key system 70 includes a wireless key system and a smart system. The wireless key system locks and unlocks the vehicle doors when the electronic key 80 is manually operated. The smart system locks and unlocks the vehicle doors when bidirectional wireless communication is established between the vehicle 1 and the electronic key 80. Bidirectional wireless communication is performed automatically and periodically between the vehicle 1 and the electronic key 80.

The electronic key 80 will now be described.

The electronic key 80 includes a key control unit 81, an LF receiver 82, a UHF transmitter 83, a lock switch 85, and an unlock switch 86. The key control unit 81 includes a non-volatile memory 81a that stores a key ID code unique to the electronic key 80. The key control unit 81 receives a request signal $S_{req}$, which is transmitted through wireless communication on the low frequency (LF) band, from the vehicle 1 with the LF receiver 82, generates a key ID code signal $S_{id}$ including the key ID code stored in the memory 81a on the ultrahigh frequency (UHF) band, and transmits through wireless communication the key ID code signal $S_{id}$ to the vehicle from the UHF transmitter 83.

When pushed by a user, the lock switch 85 and the unlock switch 86 each provide the key control unit 81 with an operation signal. Based on the operation signal from the lock switch 85 or the unlock switch 86, the key control unit 81 determines which one of the switches 85 and 86 was operated and how it was operated. More specifically, a normal operation, which is a short push of the lock switch 85 or the unlock switch 86, and a special operation, which is a long push of the lock switch 85 or the unlock switch 86, may be performed. A long push is the pushing of the switch 85 or 86 over a predetermined time or longer. The key control unit 81 holds a threshold indicating the predetermined time or a special request signal determination reference value. Each of the lock switch 85 and the unlock switch 86 is an example of a control switch. Further, each of the lock switch 85 and the unlock switch 86 is an example of a switch button.

When the key control unit 81 determines that the unlock switch 86 has been short-pushed, the key control unit 81 generates an unlock request signal $S_{un}$, which includes the key ID code stored in the memory 81a. Then, the key control unit 81 provides the generated unlock request signal $S_{un}$ to the UHF transmitter 83. The UHF transmitter 83 transmits through wireless communication the unlock request signal $S_{un}$. The unlock request signal $S_{un}$ may be modulated to a UHF band signal by the key control unit 81 or the UHF transmitter 83.

When the key control unit 81 determines that the lock switch 85 has been short-pushed, the key control unit 81 generates a lock request signal $S_{lo}$, which includes the key ID code stored in the memory 81a. Then, the key control unit 81 transmits through wireless communication the generated lock request signal $S_{lo}$ from the UHF transmitter 83. The lock request signal $S_{lo}$ may be modulated to a UHF band signal by the key control unit 81 or the UHF transmitter 83.

When the key control unit 81 determines that the lock switch 85 or the unlock switch 86 has been long-pushed from an operation signal of the lock switch 85 or the unlock switch 86, the key control unit 81 generates a special request signal $S_{sp}$ and transmits the generated special request signal $S_{sp}$ from the UHF transmitter 83 as a wireless signal on the UHF band. The special request signal $S_{sp}$ is in correspondence with a special operation performed on the lock switch 85 or the unlock switch 86.

The vehicle 1 will now be described.

A controller 11 is installed in the vehicle 1. The controller includes a verification electronic control unit (ECU) 71, a charge ECU 61, a body ECU 51, and a lock ECU 35. The ECUs 35, 51, 61, and 71 are communicable with one another through an in-vehicle local area network (LAN) 78.

The vehicle 1 includes a hybrid vehicle power train system (hybrid system) 3, a battery 4, and a plug lock device 31. The hybrid system 3 uses the power of an engine 3a and the power of a motor 3b to drive the drive wheels 2 of the vehicle 1. The battery 4 supplies electric power to the motor 3b. The plug lock device 31 locks a power plug 10, which is used to charge the battery 4.

An inlet 34 is arranged in a side wall of the vehicle 1 (e.g., behind rear right vehicle door). A power plug 10 is connected to the inlet 34. The inlet 34 is arranged in a power port 34a formed in the side wall of the vehicle 1. A lid 36 closes the power port 34a and hides the inlet 34. When the lid 36 is closed, a lid lock mechanism 33 closes the lid 36. When, for example, a lid open lever (not shown) arranged near the driver seat is operated, the lid lock mechanism 33 opens the lid 36. When the lid 36 opens, the inlet 34 is exposed.

When the lid 36 is open, the power plug 10 is connectable to the inlet 34. When the power plug 10 is connected to the inlet 34, the inlet 34 and a converter 6 connects the power plug 10 to the battery 4. A charge cable 12 supplies the power plug 10 with electric power from an external power supply 91. Accordingly, when the power plug 10 is connected to the inlet 34, the power plug 10 can supply the converter 6 with AC power from the external power supply 91 via the inlet 34. The converter 6 converts AC power from the power plug 10 to DC power and supplies the battery 4 with DC power. The charge ECU 61 controls the converter 6 to charge the battery 4.

The body ECU 51 is connected to a door lock device 55, door switches 57a to 57d, and a start switch 58.

As shown in FIG. 2A, the door switches 57a to 57d are arranged on outer door handles of the vehicle doors, respectively. When pushed, each of the door switches 57a to 57d provides an operation signal to the body ECU 51. For example, the door switch 57a is arranged on the front right door (driver door), the door switch 57b is arranged on the rear right door, the door switch 57c is arranged on the front left door, and the door switch 57d is arranged on the rear left door.

Referring to FIG. 1, the start switch 58 is arranged in the passenger compartment near the driver seat. When pushed, the start switch 58 provides an operation signal to the body ECU 51.

The verification ECU 71 includes a memory 71a storing the key ID code of the registered electronic key 80. The verification ECU 71 is connected to an exterior LF transmitter 72, an interior LF transmitter 73, and a UHF receiver 74.

Referring to FIG. 2A, the exterior LF transmitter 72 is arranged in each outer door handle to transmit a wireless signal on the LF band to the surrounding of the vehicle 1.

The interior LF transmitter 73 is arranged in the passenger compartment to transmit a wireless signal on the LF band in the passenger compartment. The UHF receiver 74 receives and demodulates wireless signals on the UHF band from inside and outside the vehicle 1.

When, for example, the engine is stopped and the vehicle doors are locked, the verification ECU 71 intermittently transmits a request signal $S_{req}$ to the surrounding of the vehicle 1 from each exterior LF transmitter 72. For example, the external LF transmitters 72 on the vehicle doors respectively form exterior communication areas A1 to A4 and transmit request signals $S_{req}$ to the corresponding exterior communication areas A1 to A4. In one example, the verification ECU 71 transmits request signals $S_{req}$ from the exterior LF transmitters 72 to the exterior communication areas A1 to A4 in a predetermined order.

The verification ECU 71 receives a key ID code $S_{id}$ returned from the electronic key 80 in response to the request signal $S_{req}$ from the UHF receiver 74. Then, the verification ECU 71 performs ID verification (door lock exterior verification) with the key ID code in the received key ID code signal $S_{id}$ and the key ID code registered to the memory 71a. Under a situation in which the verification ECU 71 accomplishes exterior verification, when the body ECU 51 detects operation of any one of the door switches 57a to 57d, the body ECU 51 activates the door lock device 55 to lock or unlock the vehicle doors. In this manner, the smart system locks and unlocks the vehicle doors. The verification ECU 71 may recognize in which one of the exterior communication areas A1 to A4 the electronic key 80 was located when exterior communication was accomplished.

When the verification ECU 71 receives an unlock request signal $S_{un}$ through the UHF receiver 74, the verification ECU 71 verifies the ID code in the received unlock request signal $S_{un}$ with the ID code stored in the memory 71a. Then, when the verification is accomplished, the verification ECU 71 activates the door lock device 55 to unlock the vehicle doors. When receiving a lock request signal $S_{lo}$, the verification ECU 71 performs ID code verification in the same manner. Then, when the verification is accomplished, the verification ECU 71 activates the door lock device 55 to lock the vehicle doors. In this manner, the wireless key system locks and unlocks the vehicle doors.

When a vehicle door opens after the exterior verification is accomplished and the vehicle doors are unlocked, the verification ECU 71 determines that the driver has entered the vehicle 1 and transmits a request signal $S_{req}$ from the interior LF transmitter 73. The interior LF transmitter 73 forms an interior communication area B1 about the interior LF transmitter 73 and transmits the request signal $S_{req}$ to the interior communication area B1.

When the verification ECU 71 receives a key ID code signal $S_{id}$ from the electronic key 80 through the UHF receiver 74, the verification ECU 71 performs ID verification (interior verification) with the key ID code registered in the memory 71a and the key ID code in the key ID code signal $S_{id}$. Under a situation in which interior verification is accomplished, when the start switch 58 is operated, the verification ECU 71 activates the hybrid system 3 and permits driving of the vehicle 1.

In the example shown in FIGS. 2A and 2B, the inlet 34 is arranged in the rear right side of the vehicle 1, that is, behind the rear right door. The exterior communication area A2 is closest to the inlet 34.

As shown in FIG. 1, the inlet 34 includes a plug lock mechanism 32 that locks the power plug 10 to the inlet 34. Under the control of the charge ECU 61, the battery 4 may be charged through the power plug 10 connected to the inlet 34.

If the door lock exterior verification is accomplished when the electronic key 80 is located in exterior communication area A2, which is formed near the rear right door and, at the same time, the controller 11 detects a special request signal $S_{sp}$ received with the UHF receiver 74, the controller 11 activates the plug lock mechanism 32 and locks or unlocks the power plug 10. For example, if the power plug 10 is locked when exterior verification is accomplished, the controller 11 unlocks the power plug 10 in response to the special request signal $S_{sp}$. The unlocked power plug 10 may be removed from the inlet 34. The plug lock device 31 includes the lock ECU 35 and the plug lock mechanism 32.

The detection of the special request signal $S_{sp}$ is one example of a first condition. The accomplishment of the door lock exterior verification of the electronic key 80 located in the exterior communication area A2 is one example of a second condition. When the first and second conditions are satisfied, the verification ECU 71 locks or unlocks the power plug 10. The power plug 10 that is connected to the inlet 34 is one example of a locking subject.

The flowchart of FIG. 3 will now be described. The flowchart briefly illustrates a process performed cooperatively by all or some of the ECUs 35, 51, 61, and 71 forming the controller 11. In the illustrated example, based on the opening and closing history and present condition of the vehicle doors and the state of the engine, when the controller 11 determines that there is a high probability of the user who is carrying the electronic key 80 standing outside the vehicle 1, the controller 11 repeats the process of FIG. 3. The controller 11 also performs in parallel a process related to the locking and unlocking of the vehicle doors.

The controller 11 checks whether or not the electronic key 80 is located in the exterior communication area A2 formed near the rear right door, that is, whether or not exterior verification has been accomplished in the exterior communication area A2 (S101). When the controller 11 determines that the electronic key 80 is not located in the exterior communication area A2 (NO in S101), the controller 11 ends the process of FIG. 3 without switching the lock state of the power plug 10.

When the controller 11 determines that the electronic key 80 is located in the exterior communication area A2, that is, the electronic key 80 is located in the exterior communication area A2 (YES in S101), the controller 11 determines whether or not a special request signal $S_{sp}$ has been received (S102).

Figure 3:
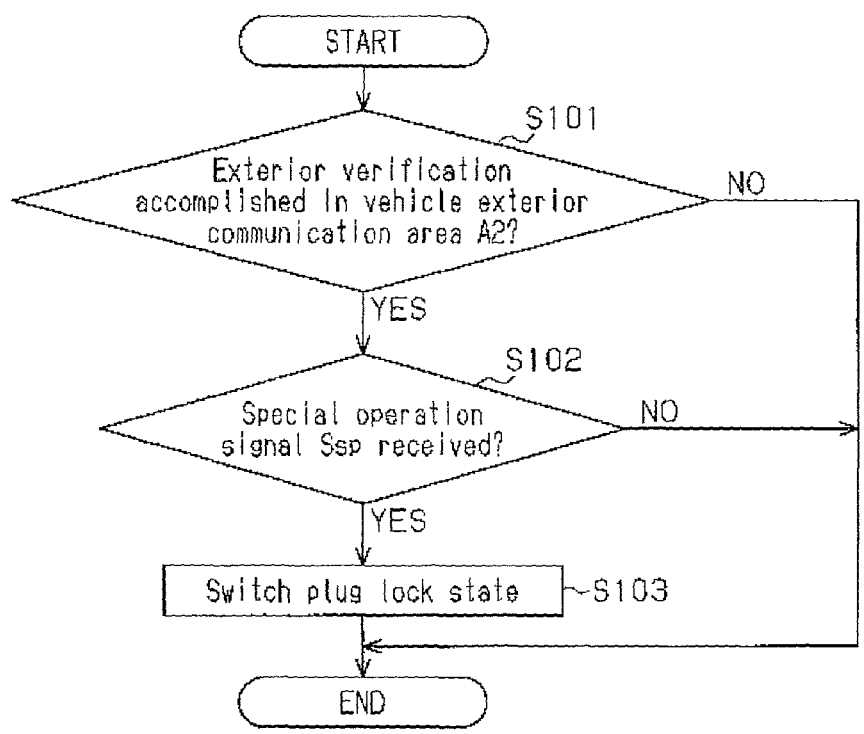
FIG. 3 is a flowchart of the processing performed by a controller in the first embodiment.

When the controller 11 determines that a special request signal $S_{sp}$ has not been received (NO in S102), the controller 11 ends the process of FIG. 3 without switching the lock state of the power plug 10. When the controller 11 determines that a special request signal $S_{sp}$ has been received (YES in S102), the controller 11 switches the lock state of the power plug 10 (S103).

The controller 11 includes computer-readable instructions to be executed by the controller 11. In some embodiments, the instructions may be stored in a computer-readable storage device, such as a magnetic disk or an optical disc, coupled to, accessed by, or included in the controller 11. In some embodiments, one or more of the ECUs 35, 51, 61, and 71 function as a controller of a lock device.

The first embodiment has the advantages described below.

(1) By performing long-pushing (special operation) on the lock switch 85 or the unlock switch 86 of the electronic key 80, the plug lock device 31, and ultimately the power plug 10 connected to the inlet 34, are switched between a lock state that restricts connection and removal of the power plug 10 to and from the inlet 34 and an unlock state that permits connection and removal of the power plug 10 to and from the inlet 34. This allows the user to use the switches 85 and 86 of the electronic key 80, which are for locking an unlocking the vehicle doors, when locking and unlocking the power plug 10. Since a dedicated switch corresponding to the plug lock mechanism 32 does not have to be arranged in the plug lock device 31, the structure of the plug lock device 31 may be simplified.

(2) Under a situation in which exterior verification is accomplished between the controller 11 and the electronic key 80, when a special operation (long-pushing) is performed on the lock switch 85 or the unlock switch 86, the controller 11 switches the power plug 10 between the lock state and the unlock state. For example, when the electronic key 80, which is held by a user, is separated from the vehicle 1 by a distance at which the smart system cannot establish wireless communication, the power plug 10 cannot be easily switched between a lock state and an unlock state. This improves the security of the plug lock device 31.

(3) If a special operation is performed on the switches 85 and 86 of the electronic key 80 when the electronic key 80 is located in the exterior communication area A2, which is closest to the inlet 34, the plug lock device 31 is switched between a lock state and an unlock state. Accordingly, the special operation allows for the user to easily recognize whether or not the state of the plug lock device 31 has been switched.

In some examples, when the switches 85 and 86 of the electronic key 80 undergo a special operation in any one of exterior communication areas A1, A3, and A4, which are relatively high from the inlet 34, the controller 11 does not permit the plug lock device 31 to switch between a lock state and an unlock state. In this configuration, when the special operation is erroneously performed on the switches 85 and 86 of the electronic key 80 in the exterior communication areas A1, A3, and A4, which are relatively far from the inlet 34, the power plug 10 cannot be easily unlocked. This improves the security of the plug lock device 31.

(4) The exterior LF transmitter 72 that transmits wireless signals of the smart system may be used to transmit a wireless signal for switching the lock state of the power plug 10. Since there is no need to provide the plug lock device 31 with an LF transmitter, the structure of the plug lock device 31 may be simplified.

A second embodiment of the present invention will now be described focusing on differences from the first embodiment.

Figure 4:
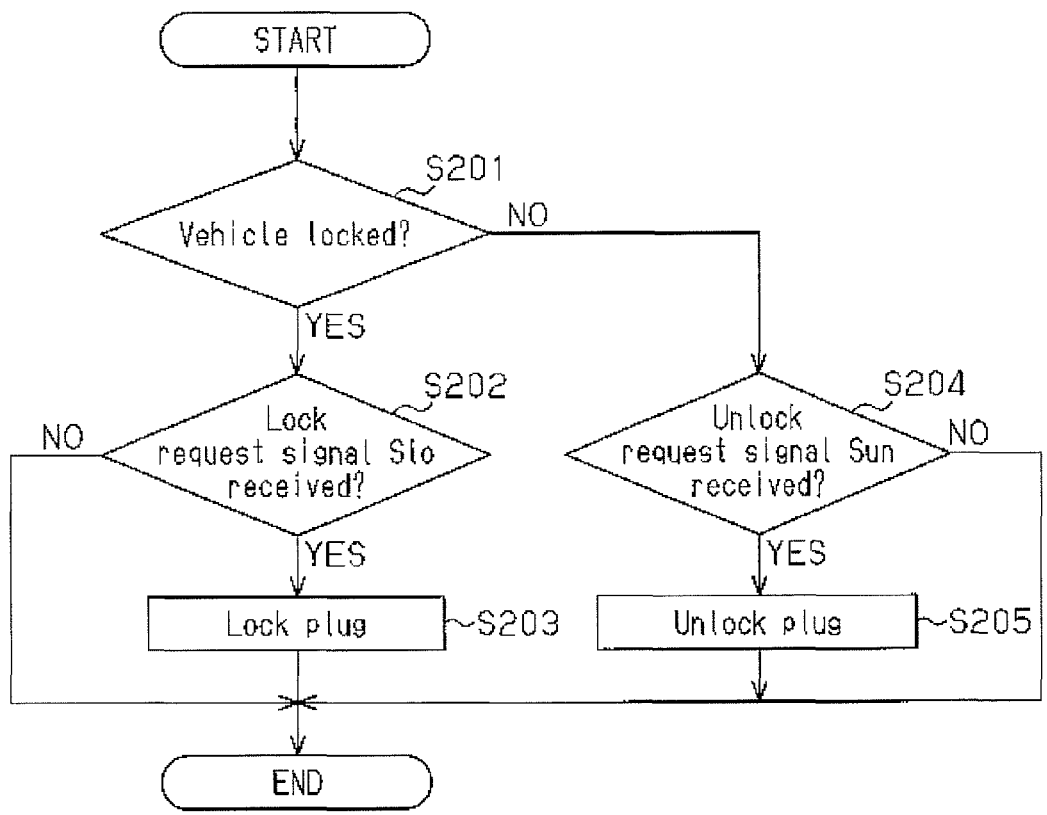
FIG. 4 is a flowchart of the processing performed by a controller in a second embodiment.

In the second embodiment, the controller 11 switches the lock state of the power plug in accordance with the flowchart of FIG. 4.

The key control unit 81 of the second embodiment does not determine whether or not a special operation has been performed on the lock switch 85 or the unlock switch 86. Thus, the electronic key 80 of the second embodiment does not transmit a special request signal $S_{sp}$.

Referring to FIG. 4, the controller 11 checks the condition of the door lock device 55, that is, whether or not the vehicle doors are locked (S201). When determining that the vehicle doors are locked (YES in S201), the controller 11 determines whether or not a lock request signal $S_{lo}$ has been received (S202). When determining that the lock request signal $S_{lo}$ has been received (YES in S202), the controller 11 switches the power plug 10 to the lock state (S203) and then ends the process of FIG. 4.

When determining that the vehicle doors are unlocked (NO in S201), the controller 11 determines whether or not an unlock request signal $S_{un}$ has been received (S204). When determining that an unlock request signal $S_{un}$ has been received (YES in S204), the controller 11 switches the power plug 10 to the unlock state (S205) and then ends the process of FIG. 4.

When determining that a lock request signal $S_{lo}$ and an unlock request signal $S_{un}$ have not been received (NO in S202 and NO in S204), the controller 11 ends the process of FIG. 4 without switching the lock state of the power plug 10.

In the second embodiment, when the vehicle 1 is in a lock state, a short-push of the lock switch 85 corresponds to a special operation. When the vehicle 1 is in an unlock state, a short-push of the unlock switch 86 corresponds to a special operation.

The second embodiment has the advantages described below.

(5) The lock device uses the lock switch 85, which is not intentionally operated by the user when the vehicle 1 is in a lock state, to switch the power plug 10 to a lock state. For example, when the vehicle 1 is locked, the user may short-push the lock switch 85 of the electronic key 80 to switch the plug lock device 31 (power plug 10) to a lock state. Further, by using the lock switch 85 to lock the power plug 10, the lock device may easily be operated by the user. Moreover, the user may successively lock the vehicle doors and lock the power plug 10. Thus, the lock device may shift to a state allowing for the user to leave the vehicle 1 within a short period of time.

(6) The lock switch uses the unlock switch 86, which is not intentionally operated by the user when the vehicle 1 is in an unlocked state, to switch the power plug 10 to an unlock state. For example, when the vehicle 1 is unlocked, the user may short-push the unlock switch 86 of the electronic key 80 to switch the plug lock device 31 to an unlock state. Further, by using the unlock switch 86 to unlock the power plug 10, the lock device may easily be operated by the user. Moreover, the user may successively unlock the vehicle doors and unlock the power plug 10. Thus, after unlocking the power plug 10, the user may shift the vehicle 1 to a drivable state within a short period of time by removing the power plug 10 from the inlet 34.

It should be apparent to those skilled in the art that the present invention may be embodied in many other specific forms without departing from the spirit or scope of the invention. Particularly, it should be understood that the present invention may be embodied in the following forms.

In the first embodiment, the controller 11 shifts the lock state of the power plug 10 when receiving a special request signal $S_{sp}$ under a situation in which exterior verification is accomplished with the electronic key 80 located in the exterior communication area A2. Instead, the lock state of the power plug 10 may be switched regardless of whether or not the controller 11 accomplishes exterior verification. In this modification, the lock state of the power plug 10 may be switched from a position that is separated from the vehicle 1. This is convenient.

In the above embodiment, the lock state of the power plug 10 may be switched in response to a special operation performed on the lock switch 85 or the unlock switch 86. Instead, the controller 11 may activate the lid lock mechanism 33 to switch the lid 36 between a lock state and an unlock state in response to the special operation. The lid 36 cannot be opened when locked and can be opened when unlocked. For example, the lock ECU 35 provides the lid lock mechanism 33 with a drive signal to switch the lid 36 between a lock state and an unlock state. In some embodiments, when the conditions of transponder verification or the like are satisfied, the controller 11 activates the lid lock mechanism 33 and switches the lid 36 between closed and open states. In this example, the lid 36 corresponds to a locking subject.

In the first embodiment, the special operation is a long push of the lock switch 85 or the unlock switch 86. Instead, the special operation may be short pushes performed a number of times on the lock switch 85 or the unlock switch 86. In this case, in the same manner as the first embodiment, the key control unit 81 may determine whether or not a special operation was performed on the electronic key 80 based on an operation signal from the lock switch 85 or the unlock switch 86. Alternatively, the controller 11 may determine whether or not a special operation was performed on the electronic key 80 by receiving the lock request signal $S_{lo}$ or the unlock request signal $S_{un}$ for a number of times. Further, the lock switch 85 and the unlock switch 86 may be simultaneously pushed as the special operation. In this case, when the key control unit 81 simultaneously receives operation signals from the lock switch 85 and the unlock switch 86, the key control unit 81 may transmit through wireless communication the special request signal $S_{sp}$ from the UHF transmitter 83.

In the first embodiment, if a special request signal $S_{sp}$ is detected when door lock exterior verification is accomplished on the electronic key 80 located in the exterior communication area A2 that is closest to the inlet 34, the power plug 10 is switched between an unlock state and a lock state. However, the lock states of the power plug 10 may also be switched when the electronic keys 80 are located in the other exterior communication areas A1, A3, and A4.

For example, if the controller acknowledges a special request signal $S_{sp}$ when exterior verification is accomplished on the electronic key 80 located in the exterior communication area that is located near the front right door (driver door), the controller 11 switches the power plug 10 to a lock state. In this case, the location where an operation is performed to switch the lock state of the power plug 10 (exterior communication area A1) is close to where a fuel lid lever is located, which is the vicinity of the driver seat, in a conventional vehicle. Thus, a user accustomed to the structure of a conventional vehicle may switch the lock state of the power plug 10 without being confused. This configuration may be employed especially in vehicles that do not include exterior communication areas A2 and A4 set for the rear doors.

In the above embodiments, among the plurality of exterior communication areas set around the vehicle 1, the exterior communication area A2 is closest to the back door. In the example illustrated in FIG. 2A, the door switch 37e and the exterior LF transmitter 72 may be arranged in a handle of a back door. In this case, the controller 11 forms an exterior communication area by transmitting the request signal $S_{req}$ to the surrounding of the back door from the exterior LF transmitter 72 of the back door. For example, the power plug 10 may be stored in the luggage compartment. In this case, the user may open the back door to remove the power plug 10 from the luggage compartment and then perform a special operation on the lock switch 85 or the unlock switch 86 near the back door to open the lid 36. Thus, the user may smoothly carry out a sequence of tasks from the removal of the power plug 10 to the connection of the power plug 10 to the inlet 34.

Referring to the broken lines in FIG. 1, in the above embodiments, a touch sensor 59 may be arranged in each door handle. If the controller 11 recognizes with a touch sensor 59 that the user has touched a door handle, the controller 11 switches the vehicle doors from a lock state to an unlock state.

In the above embodiments, the inlet 34 (including the lid 36 and the lock mechanisms 32 and 33) is arranged in the right rear side of the vehicle body but may be arranged at other locations, such as the left rear side or front portion of the vehicle body. The one of the exterior communication areas A1 to A4 closest to the inlet 34 differs in accordance with the location of the inlet 34.

In the above embodiments, the user may switch the lock state of the power plug 10 by performing a special operation on the lock switch 85 or the unlock switch 86 in the exterior communication areas A1 to A4. Instead, the user may switch the lock state of the power plug 10 by performing a special operation or a normal operation (short push) on the lock switch 85 or the unlock switch 86 in the interior communication area B1. In this case, the location where an operation is performed to switch the lock state of the power plug 10 (interior communication area B1) is close to where a fuel lid lever is located, which is the vicinity of the driver seat, in a conventional vehicle. Thus, a user accustomed to the structure of a conventional vehicle may switch the lock state of the power plug 10 without being confused. In this configuration, for example, the lock state of the power plug 10 may be switched by short-pushing the lock switch 85 or the unlock switch 86 in the vehicle 1. The lock state of the vehicle doors is seldom switched when the electronic key 80 is located in the vehicle 1. Thus, in the vehicle 1, there would be no problem when using the lock switch 85 and the unlock switch 86 to switch the lock state of the power plug 10.

The lock state of the power plug 10 may be switched when a special operation is performed on the lock switch 85 or the unlock switch 86 in any one of the exterior communication areas A1 to A4 and the interior communication area B1.

The lock state of the power plug 10 may be switched by performing a normal operation on the lock switch 85 or the unlock switch 86 in the exterior communication areas A1 to A4.

In the first embodiment, the power plug 10 may be switched between a lock state and an unlock state by performing a special operation on the lock switch 85 or the unlock switch 86. Instead, a special operation may be performed to switch the power plug 10 only from a lock state to an unlock state to prohibit switching from an unlock state to a lock state.

In the above embodiment, the control contents of the ECUs 35, 51, 61, and 71 forming the controller 11 may be changed.

In the above embodiment, the exterior LF transmitter 72 for the smart system is used for communication related to the switching of the lock state of the power plug 10. However, an LF transmitter dedicated for plug locking may be arranged in the vehicle 1 near the inlet 34. The LF transmitter transmits a request signal $S_{req}$ around the inlet 34. Otherwise, the configuration may be the same as the above embodiments.

In the above embodiments, the vehicle 1 may be an electric vehicle instead of a hybrid electric vehicle.

In the first embodiment, the special operation for switching the power plug 10 from a lock state to an unlock state and the special operation for switching the power plug 10 from an unlock state to a lock state are both long-pushes and thus the same. However, the two special operations may differ from each other. For example, the power plug may be switched from a lock state to an unlock state when a control switch is operated by a first predetermined number of times, and the power plug may be switched from an unlock state to a lock state when a control switch is operated by a second predetermined number of times. In this case, the key control unit 81 holds the first and second predetermined number as special request signal determination reference values.

In the first embodiment, when receiving the special request signal $S_{sp}$, the controller 11 switches the lock state of the power plug 10. However, the controller 11 may determine whether or not exterior verification has been accomplished by periodically transmitting the request signal $S_{req}$ from the vehicle after receiving the special request signal $S_{sp}$, and then switching the power plug to the lock state when exterior verification is no longer accomplished.

In the first embodiment, the lock switch 85 and the unlock switch 86 are separately arranged. However, the switches 85 and 86 may be combined into a lock-unlock switch. In this case, when the lock-unlock switch is short-pushed, the electronic key 80 transmits a lock-unlock request signal. When the controller 11 receives and acknowledges the lock-unlock request signal, the controller 11 switches the lock-unlock state of the vehicle doors. When the lock-unlock switch undergoes a special operation (e.g., long pushing), the electronic key 80 transmits the special request signal $S_{sp}$.

The key control unit 81 may include the key ID code in the special request signal $S_{sp}$ when transmitting through wireless communication the special request signal $S_{sp}$ from the UHF transmitter 83. The controller 11 switches the lock state of the power plug 10 only when the key ID code in the received special request signal $S_{sp}$ is verified. Thus, the lock state of the power plug 10 cannot easily be switched based on a special request signal from a key other than the authentic electronic key 80.

In the second embodiment, step S101 of FIG. 3 may be performed before step S201 of FIG. 4. For example, when determining that exterior verification has been accomplished on the electronic key 80 that is located in the exterior communication area A2 (YES in S101), the controller 11 processes step S201. When determining that the electronic key 80 is not located in the exterior communication area A2 (NO in S101), the controller 11 ends the processing without switching the lock state of the power plug 10. The exterior communication area A2 may be replaced by one of the exterior communication areas A1, A3, and A4 and the interior communication area B1. This example has advantage (2) of the first embodiment.

In lieu of or in addition to the lock switch 85 and the unlock switch 86, the controller 11 may switch the lock state of the power plug 10 in response to a special operation performed on a different control switch, such as a switch manually operated by a user to open and close a slide door.

The above description is intended to be illustrative, and not restrictive. For example, the above-described examples (or one or more aspects thereof) may be used in combination with each other. Inventive subject matter may lie in less than all features of a particular disclosed embodiment and may be modified within the scope and equivalence of the appended claims.

The invention claimed is:

1. A lock device to be arranged in a vehicle including an inlet used for charging and a door lock device for locking doors of the vehicle, wherein the vehicle is configured to perform a predetermined control operation in accordance with a control request signal transmitted through wireless communication from an electronic key when a normal operation is performed on a control switch of the electronic key, the lock device comprising:
   a lock mechanism configured to switch a locking subject related with the inlet between a lock state and an unlock state; and
   a controller that controls the lock mechanism to switch the locking subject between the lock state and the unlock state when detecting a special operation performed on the control switch,
   wherein the controller is configured to perform operations comprising:

checking a condition of the door lock device to determine whether the doors of the vehicle are in a lock state or an unlock state,
   if the controller receives a first signal that corresponds to the special operation when the doors are in the lock state, switching the locking subject from the unlock state to the lock state via the lock mechanism, and
   if the controller receives a second signal that corresponds to the special operation when the doors are in the unlock state, switching the locking subject from the lock state to the unlock state via the lock mechanism.

2. The lock device according to claim 1, wherein
   the controller permits the predetermined control operation of the vehicle when the electronic key is verified through wireless communication performed between the vehicle and the electronic key, and
   the controller switches the locking subject between the lock state and the unlock state under a condition that the wireless communication and the special operation of the control switch have both been performed.

3. The lock device according to claim 2, wherein
   a plurality of exterior communication areas are around the vehicle, and
   the wireless communication is performed with the electronic key located in one of the exterior communication areas that is closest to the inlet.

4. The lock device according to claim 2, wherein
   a plurality of exterior communication areas are around the vehicle, and
   the wireless communication is performed with the electronic key located in one of the exterior communication areas that is closest to a driver door.

5. The lock device according to claim 2, wherein the wireless communication is performed with the electronic key located in an interior communication area in the vehicle.

6. The lock device according to claim 2, wherein
   a plurality of exterior communication areas are around the vehicle, and
   the wireless communication is performed with the electronic key located in one of the exterior communication areas that is closet to a back door.

7. The lock device according to claim 1, wherein
   the control switch includes an unlock switch,
   the control request signal includes an unlock request signal transmitted from the electronic key when a normal operation is performed on the unlock switch,
   the unlock request signal requests for the doors of the vehicle to be unlocked as the predetermined control operation, and
   when the vehicle is already unlocked and the controller receives the unlock request signal, the controller determines that the special operation has been performed on the unlock switch of the electronic key and controls the lock mechanism.

8. The lock device according to claim 1, wherein
   the control switch includes a lock switch operated to lock the doors of the vehicle,
   the control request signal includes a lock request signal transmitted from the electronic key when a normal operation is performed on the lock switch,
   the lock request signal requests for the doors of the vehicle to be locked as the predetermined control operation, and
   when the vehicle is already locked and the controller receives the lock request signal, the controller determines that the special operation has been performed on the lock switch of the electronic key and controls the lock mechanism.

9. The lock device according to claim 1, wherein the locking subject includes a power plug connected to the inlet.

10. The lock device according to claim 1, wherein the locking subject includes an inlet lid that hides the inlet.

11. The lock device according to claim 1, wherein the normal operation is a short push, and the special operation is a long push or a plurality of short pushes.

12. The lock device according to claim 1,
wherein the controller is configured to switch the locking subject alone between the lock state and the unlock state when receiving the first signal or the second signal.

13. An electronic key system comprising:
an electronic key including a first switch button, a second switch button, and a key controller, which transmits through wireless communication a door unlock request signal when the first switch button is pushed and a door lock request signal when the second switch button is pushed; and
a controller programmed to control a door lock device and a power plug lock mechanism that are arranged in a vehicle, wherein the controller includes
instructions configured to check a condition of the door lock device to determine whether doors of the vehicle are in a lock state or an unlock state,
instructions configured to control the door lock device to unlock the doors if the door unlock request signal is received when the doors are in the lock state,
instructions configured to control the door lock device to lock the doors if the door lock request signal is received when the doors are in the unlock state,
instructions configured to control the power plug lock mechanism to unlock the power plug if the door unlock request signal is received when the doors are in the unlock state, and
instructions configured to control the power plug lock mechanism to lock the power plug if the door lock request signal is received when the doors are in the lock state.

* * * * *

UNITED STATES PATENT AND TRADEMARK OFFICE
CERTIFICATE OF CORRECTION

PATENT NO.        : 9,495,819 B2
APPLICATION NO.   : 14/086097
DATED             : November 15, 2016
INVENTOR(S)       : K. Morita Page 1 of 1

It is certified that error appears in the above-identified patent and that said Letters Patent is hereby corrected as shown below:

In the Claims

Column 12, Line 43 (Claim 6, Line 6) please change "is closet" to --is closest--

Signed and Sealed this
Twenty-fifth Day of April, 2017

Michelle K. Lee
*Director of the United States Patent and Trademark Office*